US010554657B1

(12) United States Patent
Siddiqui et al.

(10) Patent No.: US 10,554,657 B1
(45) Date of Patent: Feb. 4, 2020

(54) USING AN AUDIO INTERFACE DEVICE TO AUTHENTICATE ANOTHER DEVICE

(71) Applicant: Amazon Technologies, Inc., Seattle, WA (US)

(72) Inventors: Shariq Siddiqui, Seattle, WA (US); Daniel Wade Hitchcock, Bothell, WA (US); Bharath Kumar Bhimanaik, Sammamish, WA (US); Natalie Nguyen, Bellevue, WA (US); Annabelle Richard Backman, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 186 days.

(21) Appl. No.: 15/665,327

(22) Filed: Jul. 31, 2017

(51) Int. Cl.
*H04L 29/06* (2006.01)
*G10L 17/00* (2013.01)

(52) U.S. Cl.
CPC ........ *H04L 63/0861* (2013.01); *G10L 17/005* (2013.01); *H04L 63/083* (2013.01); *H04L 63/105* (2013.01)

(58) Field of Classification Search
CPC ........... G06Q 20/3272; G06Q 20/3223; G06Q 20/4014; G06Q 20/401; G06Q 20/4012; G06Q 20/40145; H04L 63/0861; H04L 63/083; H04L 63/08; H04L 63/105; H04L 63/0846; H04L 63/102; H04L 67/306; H04L 9/3231; H04L 9/3226; H04W 12/06; H04W 12/08; G06F 21/31; G06F 21/44; H04N 7/188
See application file for complete search history.

(56) References Cited

U.S. PATENT DOCUMENTS

| | | | |
|---|---|---|---|
| 9,147,054 B1 * | 9/2015 | Beal | G06F 21/32 |
| 9,606,983 B1 | 3/2017 | McClintock et al. | |
| 2011/0054647 A1 * | 3/2011 | Chipchase | H04M 3/42127 700/94 |
| 2014/0175179 A1 * | 6/2014 | Carter | G06K 19/06037 235/494 |
| 2015/0170665 A1 | 6/2015 | Gundeti et al. | |
| 2015/0222615 A1 * | 8/2015 | Allain | H04L 63/08 726/4 |
| 2016/0042748 A1 | 2/2016 | Jain et al. | |

* cited by examiner

*Primary Examiner* — Brian F Shaw
(74) *Attorney, Agent, or Firm* — Thomas | Horstemeyer, LLP

(57) ABSTRACT

Disclosed are various embodiments for using an audio interface device to facilitate authentication for other devices. An authentication service causes a first client device to present an authentication code via an output device of the first client device. The authentication service receives the authentication code from a second client device. The second client device is in an authenticated state for access to an account, and the second client device received the authentication code from an environmental sensor while in a listening mode. The authentication service authenticates the first client device for access to the account in response to determining that the authentication code received from the second client device matches the authentication code presented by the first client device.

20 Claims, 9 Drawing Sheets

USING AN AUDIO INTERFACE DEVICE TO AUTHENTICATE ANOTHER DEVICE

BACKGROUND

Users may have to authenticate themselves in order to access networked resources via a computing device. The authentication may be necessary in order to access secured resources such as subscription-based content or to access stored preferences or receive personalized content. Users may be asked to establish a new account or to log in via an account with a federated identity provider. Authentication via a "living room" device such as a television or a set-top box may be cumbersome if an on-screen keyboard is required to enter a username, a password, answers to knowledge-based questions, or other security credentials.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to using an audio interface device in order to authenticate another device, such as a television or a set-top box. Authenticating so-called "living room" devices or headless devices can be difficult as they may lack common user input devices such as keyboards or microphones. For example, a television may prompt a user to key in an email address and a password through an on-screen keyboard. However, the user may have to use a remote control having a limited number of buttons (e.g., arrow buttons and an enter button) to manipulate the on-screen keyboard. This can take time and induce frustration, particularly when entering long usernames or passwords that may include mixed cases, numbers, and special characters.

Other approaches may involve code-based linking. With code-based linking, a randomized code may be shown on the display, and the user may be prompted to enter the code using another authenticated device, such as a web browser or special-purpose application on a tablet, smartphone, laptop, desktop, or other device with additional input capabilities. Nonetheless, it may be cumbersome for a user to transfer the displayed code to an authenticated device.

Various embodiments of the present disclosure provide approaches for using an audio interface device to facilitate code-based linking. In one example, a user can simply speak the code to the audio interface device, when then causes the device that displayed the code to become authenticated. In another example, the device requesting authentication can transmit the code to nearby devices—by audio, video, or other signals—and the audio interface device or other limited capability device can receive the code signal and cause the device requesting authentication to become authenticated. In addition to authenticating a device, the approaches described herein may be used to authorize pending transactions for the device.

Figure 1A:
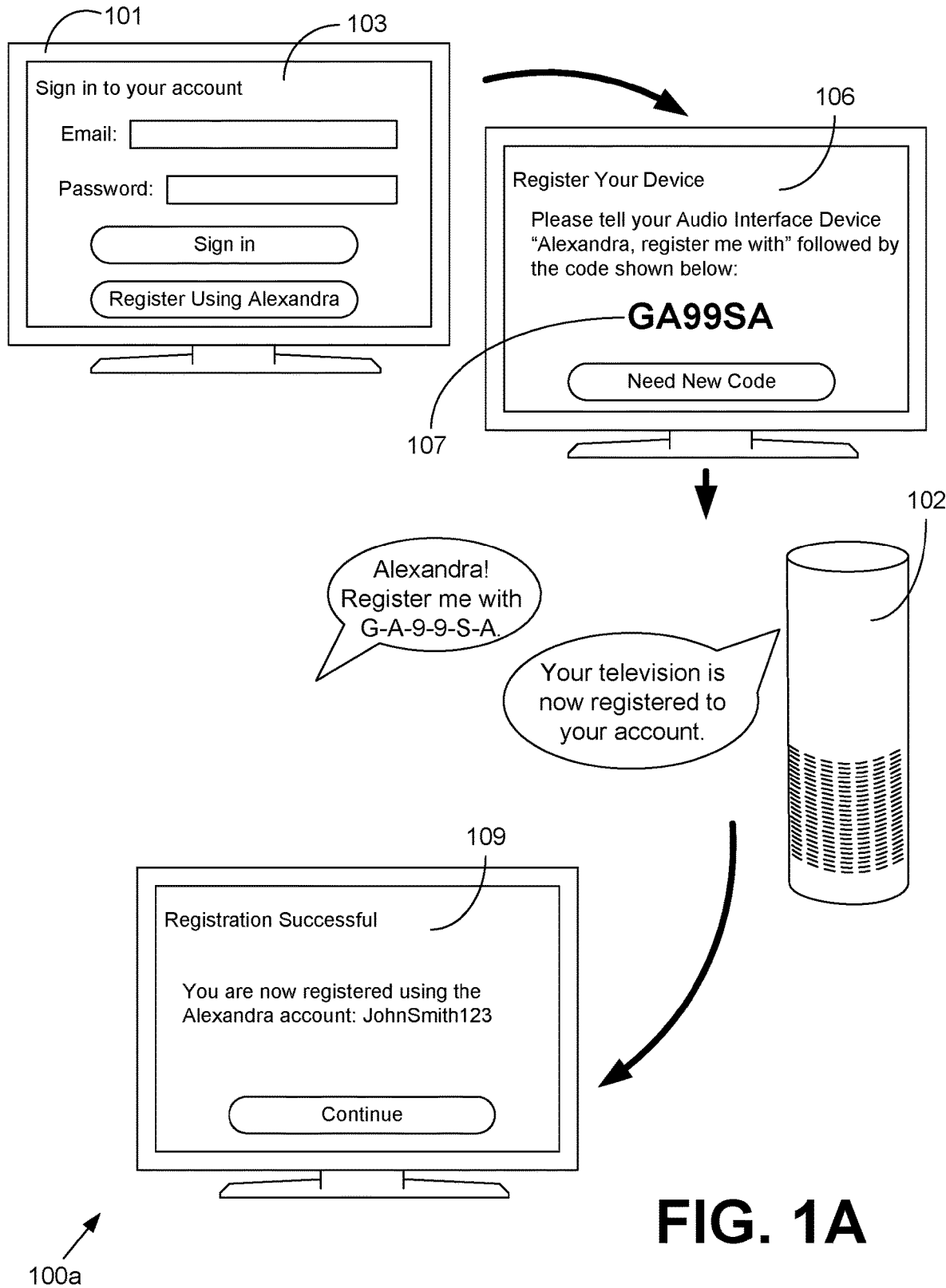
FIGS. 1A-1C are drawings of example scenarios involving authentication of a device using an audio interface device according to various embodiments of the present disclosure.

Turning now to FIG. 1A, shown is a drawing of an example scenario 100a in which a television 101 is authenticated using an audio interface device 102. To begin, the television 101, which in this example lacks a touchscreen or a keyboard, presents an opportunity for a user to log in to an existing account with a form-based interface at screen 103. Upon navigating to one of the form fields for username or password, the television 101 may show an on-screen keyboard and allow the user to fill in text using buttons on a remote control. Here, an alternative is shown through the button labeled "Register Using Alexandra." This refers to registering the television using an existing account with an identity provider (here, "Alexandra"), which may be a third party providing identity federation.

Upon selecting the button, the television 101 next renders the screen 106 that presents an authentication code 107. The authentication code 107 may be a randomized or unique code that identifies an authentication request for the television for a certain time window of validity. In this example, the authentication code 107 is "GA99SA," and the user is instructed to interact with his or her audio interface device 102 to supply the authentication code 107 to the audio interface device 102.

The authentication code 107 can be generated according to a variety of approaches, including those described in U.S. Pat. No. 9,606,983, entitled "HUMAN READABLE MECHANISM FOR COMMUNICATING BINARY DATA," and issued on Mar. 28, 2017, which is incorporated herein by reference in its entirety. This patent describes techniques for communicating a binary string such as an authentication code 107. A dictionary is seeded with multiple word sets (e.g., a set of nouns and a set of adjectives) and symbols are then created by combining words from the set of words. For example, adjective-noun pairs are created by combining one word from each set to create a symbol. A mapping of symbols to corresponding binary values is generated to translate bit values to symbols and symbols to bit values.

The user next interacts with the audio interface device 102 to supply the authentication code 107. The user first says a wake word—"Alexandra!"—and then says a command "Register me with," followed by the authentication code 107—"G-A-9-9-S-A." The audio interface device 102 receives the spoken authentication code 107 from the user and reports it back to an authentication service, which verifies the at the spoken authentication code 107 matches the authentication code 107 presented by the television 101. As an additional authentication factor, the audio interface device 102 or the authentication service can be configured to verify that the authentication code 107 is spoken by an authorized user, e.g., with voice profiling. If the spoken authentication code 107 does not match the authorized user's voice, the access may be denied, even if the authentication code 107 is correct.

The audio interface device 102 then reports back to the user that "Your television is now registered to your account." The television 101 next renders a confirmation screen 109 indicating that the television 101 is now registered using a certain account with the identity provider, "JohnSmith123." Subsequently, the user can interact with the television 101 to access secured content, personalizations, or other resources associated with the "JohnSmith123" account.

Figure 1B:
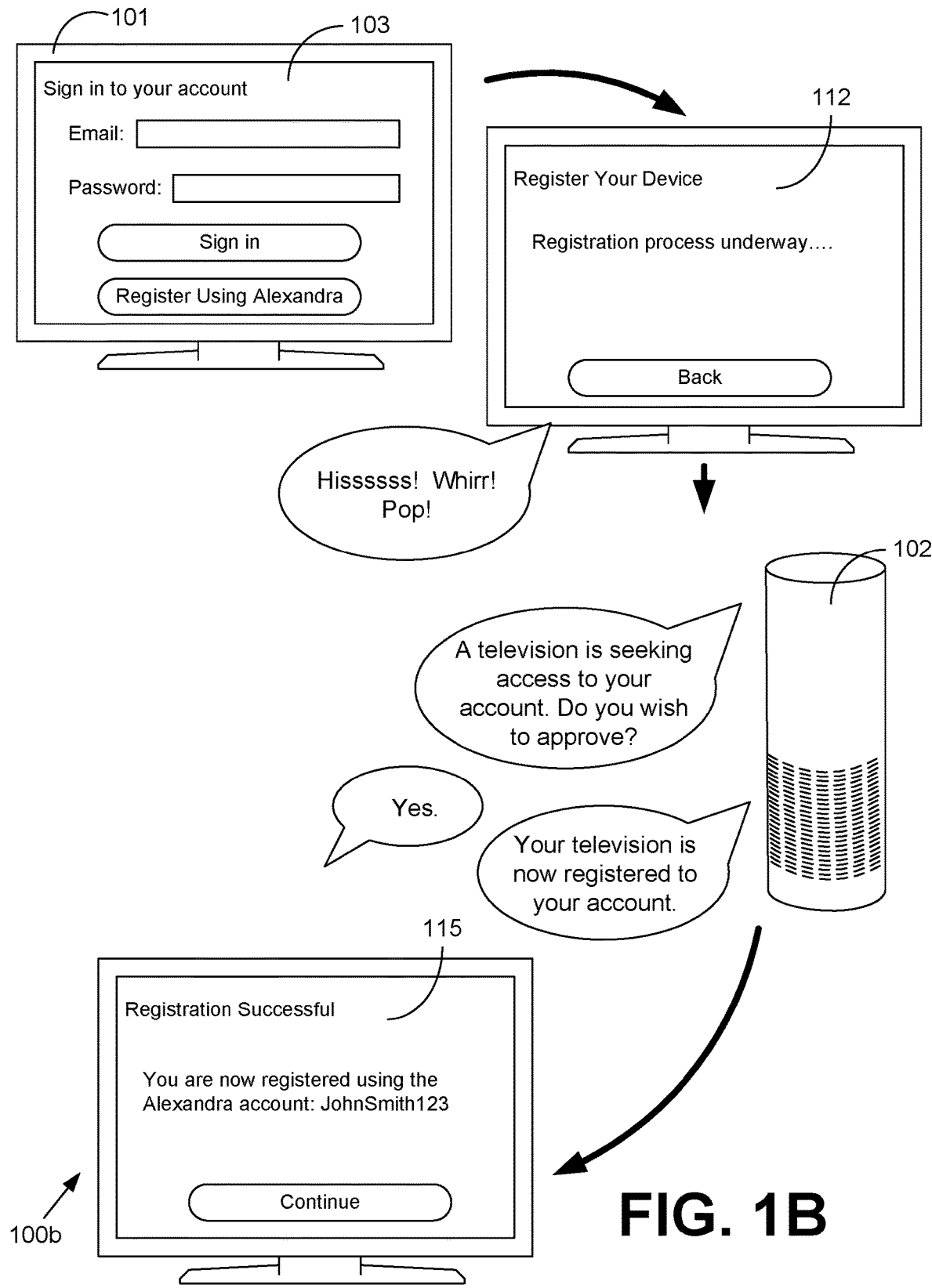

Continuing to FIG. 1B, shown is a drawing of another example scenario 100b in which a television 101 is authenticated using an audio interface device 102. In this scenario 100b, the user does not need to repeat an authentication code 107 (FIG. 1A), as the authentication code 107 is communicated directly from the television 101 to the audio interface device 102. Although the same or similar initial screen 103 may be shown, the subsequent screen 112 indicates that a registration process is being performed. The television 101 then emits audio that encodes an authentication code 107, which is represented here by "Hissssss! Whirr! Pop!" In other examples, the audio may be in an ultrasonic frequency and not normally audible by humans. In still other examples, the audio may include music, such as a preferred music associated with the user's account, where different user accounts may be associated with different music. Such music may include audible or inaudible watermarking to encode the authentication code 107.

The audio interface device 102 is in a listening mode, and as such, picks up the audio via a microphone and interprets the audio as the authentication code 107. The audio interface device 102 may send the authentication code 107 or the audio over a network to an authentication service for processing. As shown, the audio interface device 102 may prompt the user to confirm authentication of the television. In this example, the audio interface device 102 informs the user via audio that "a television is seeking to access your account. Do you wish to approve?" The user follows with an approval of "Yes," and the audio interface device 102 interacts with the authentication service to authenticate and register the television 101 for access to account resources. In some cases, the audio interface device 102 can be configured to verify that the approval is spoken by an authorized user, e.g., with voice profiling. If the approval does not match the authorized user's voice, the access may be denied. At the screen 115, the television 101 reports a confirmation that indicating that the television 101 is now registered using a certain account with the identity provider, "JohnSmith123."

Figure 1C:
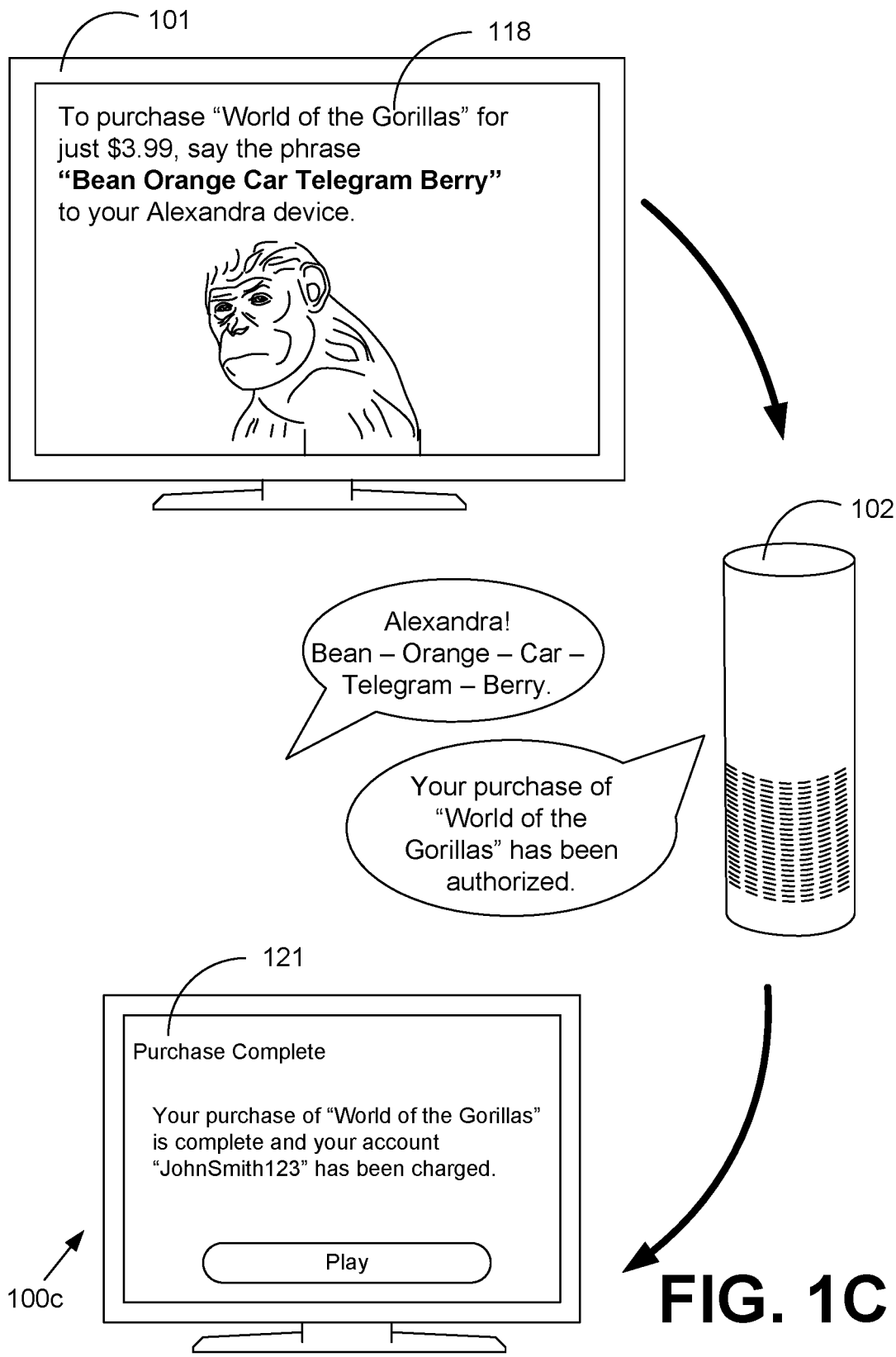

Moving on to FIG. 1C, shown is a drawing of another example scenario 100b in which a pending transaction for the television 101 is authenticated using an audio interface device 102. At screen 118, the television 101 informs the user that a movie may be purchased by repeating a certain phrase (corresponding to an authentication code 107 (FIG. 1A)) to an audio interface device 102. The user then wakes the audio interface device 102 ("Alexandra!") and proceeds to say the authentication code 107 ("Bean—Orange—Car—Telegram—Berry"). The audio interface device 102 receives this authentication code 107 via a microphone and sends it to an authentication service. The authentication service verifies the authentication code 107 and causes the audio interface device 102 to report back that the transaction has been authorized. Subsequently, at screen 121, the television 101 reports to the user that the purchase is complete and the account associated with the audio interface device 102 ("JohnSmith123") has been charged.

As an additional authentication factor, the audio interface device 102 can be configured to verify that the authentication code 107 is spoken by an authorized user, e.g., with voice profiling. If the spoken authentication code 107 does not match the authorized user's voice, the access may be denied, even if the authentication code 107 is correct. In one embodiment, the set of authorized users may be dynamically determined for a given area. For example, all users logged into an application on their smartphones that report a location within a threshold proximity of the audio interface device 102 may be considered authorized users, where an authorization by one of the set of users could cause that respective user's account to be charged or otherwise to have the transaction performed relative to that respective user's account.

Similarly, transaction authorization may be performed in the context of a drive through window, where the audio interface device 102 inside or integrated into a motor vehicle. For example, purchase identifying information may be transmitted to the audio interface device 102 from a speaker or other output device of the drive through. User approval may be solicited in order to approve a transaction, which may include placing an order as well as possibly charging a payment instrument associated with the user's account. In one embodiment, the purchase identifying information including contents of a proposed order may be transmitted to the audio interface device 102 and presented to the user via a display or audibly through a speaker. Through the authentication principles of the present disclosure, the computing systems of the drive through may be able to identify the user and leverage user personalization, such as recommendations based on the user's prior orders.

In the following discussion, a general description of the system and its components is provided, followed by a discussion of the operation of the same.

Figure 2:
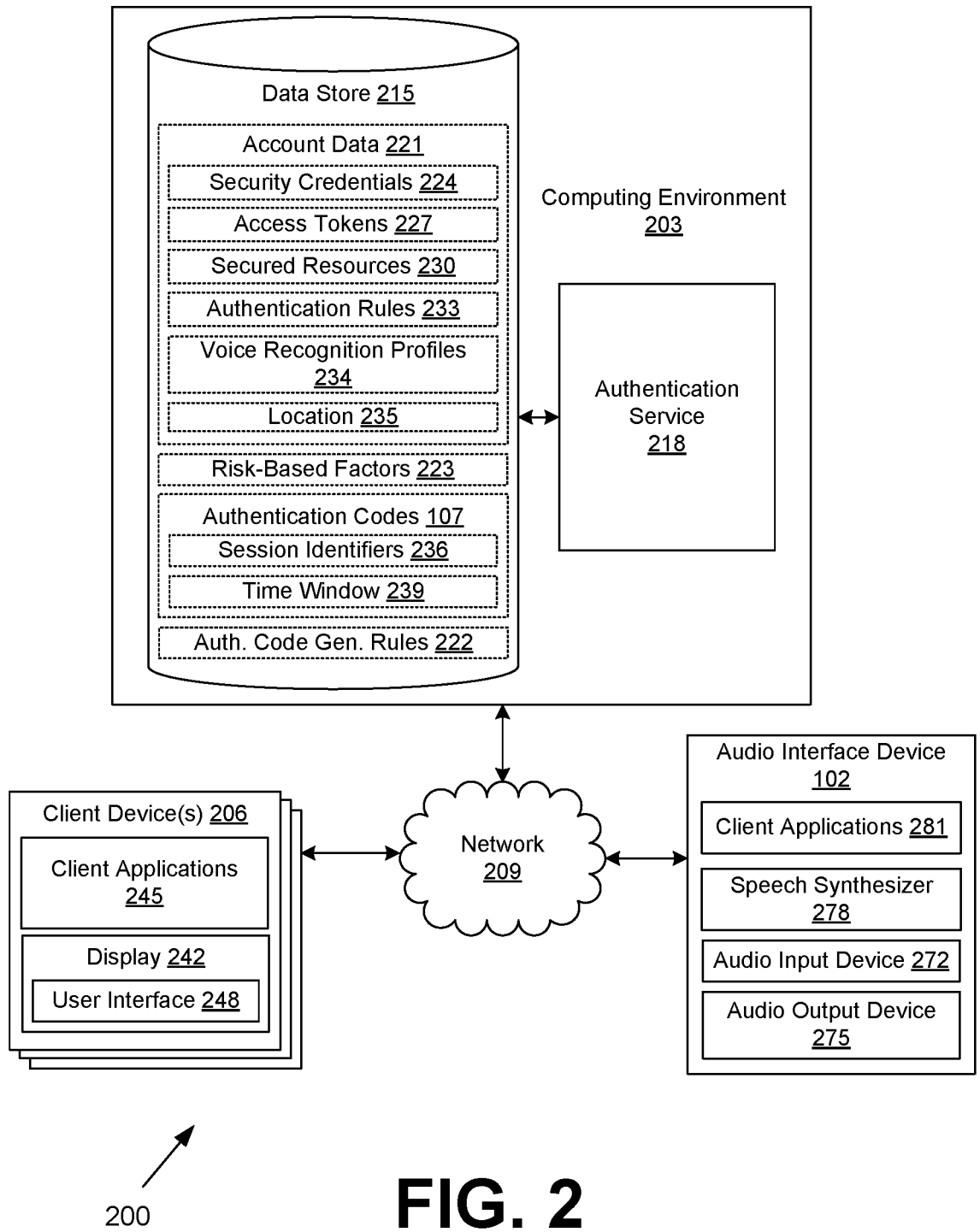
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more client devices 206, and one or more audio interface devices 102, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include an authentication service 218 and other applications, services, processes, systems, engines, or functionality not discussed in detail herein. The authentication service 218 is executed to authenticate client devices 206 and audio interface devices 102 for access to user accounts. The user accounts may provide access to secured resources or other network services. As will be described, the authentication service 218 can leverage authentication of an audio interface device 102 to bootstrap or assist authentication of client devices 206 that may lack input or output devices, such as touchscreens, keyboards, or audio interfaces. The authentication service 218 may similarly facilitate approval of pending transactions being performed by the client devices 206 using the audio interface device 102.

The data stored in the data store 215 includes, for example, account data 221, authentication codes 107, authentication code generation rules 222, risk-based factors 223, and potentially other data. The account data 221 includes data associated with user accounts for network services. In some situations, the operator of the authentication service 218 may provide the network services. Otherwise, the operator of the authentication service 218 may provide a federated identity service that may be used by third parties to authenticate access to network services operated by the third parties. The account data 221 may include security credentials 224, access tokens 227, secured resources 230, authentication rules 233, voice recognition profiles 234, one or more locations 235, and/or other data.

The security credentials 224 may include usernames, passwords, answers to knowledge-based questions, keys, biometric profiles, personal identification numbers, and/or other long-lived credentials used to authorize or authenticate access to an account. The security credentials 224 are long-lived in the sense that they may persist for a relatively long period of time (e.g., ninety days) until they are required to be changed, or perhaps indefinitely until changed by the user. Authentication for access to an account may require a combination of one or more security credentials 224.

The account data 221 can also include access tokens 227 that are used to provide client devices 206 with access to the account. For example, once a client device 206 is authenticated, an access token 227 can be issued to the client device 206 that is used by the client device 206 to access a network service that requires authentication. The access tokens 227 may be long-lived or short-lived. For example, an access token 227 that is a registration token may be valid indefinitely, while an access token 227 that is a session token may be valid for a short time period (e.g., one hour, or until an application is exited).

The secured resources 230 may correspond to protected data of an account that a client device 206 that is authenticated for the account can access. To this end, the secured resources 230 may include protected content, licenses, encryption keys, preferences, personalizations, interaction histories, transaction histories, and so forth. The authentication rules 233 may configure how client devices 206 are authenticated and under what condition transactions may be authorized or approved. For example, the authentication rule 233 may enable a parental control system that requires additional verification in order to complete a transaction or perform authentication. The voice recognition profiles 234 may include data that profiles a user's voice so as to enable speaker identification or recognition. The locations 235 may indicate locations where a user may be a potential speaker or authorizer of transactions. Such locations 235 may be reported by the audio interface device 102 or other client devices 206 based on network address geolocation, network access point or cell tower location finding, global positioning system (GPS) coordinates, and/or other approaches.

The authentication codes 107 include randomized or unique codes that are generated to facilitate authentication or authorization of a client device 206 by an audio interface device 102. The authentication code 107 can include a string of letters, numbers, and special characters, and/or words and phrases. In some cases, the authentication code 107 may be binary data. Each authentication code 107 can be associated with a session identifier 236 that uniquely identifies a client device 206 that has requested authentication. An authentication code 107 can also be associated with a time window 239 for validity, where the authentication code 107 may be valid only if presented within the time window 239. The time window 239 may be selected to be relatively brief (e.g., thirty seconds) to minimize the chance that an authentication code 107 could be compromised or reused.

The authentication code generation rules 222 control the generation of authentication codes 107 by the authentication service 218 or by the client devices 206. The authentication code generation rules 222 may specify a required level of entropy, or complexity, for authentication codes 107. For example, entropy may be increased by requiring more characters or using a larger character set. Where the authentication code 107 is a word or phrase, entropy can be increased by using a larger dictionary or by using a greater number of words. Authentication codes 107 with lower levels of entropy may be susceptible to brute force compromises. In one embodiment, an authentication code 107 may correspond to a security assertion signed by a key in a public/private key pair. Where the authentication code 107 is generated for a user to speak, the authentication code generation rules 222 may dictate that certain characters with similar pronunciation in a given dialect or language may not be used. For example, it may be that a "b" may be indistinguishable from a "v" for many speakers of a given dialect, and the authentication code generation rules 222 may specify that both "b" and "v" are to be avoided. However, it is noted that this may depend on a specified language or dialect in use by users of the audio interface device 102.

The risk-based factors 223 include factors that that may lead the authentication service 218 to preclude authentication or authorization of a transaction independently from whether the audio interface device 102 is authenticated or if a correct authentication code 107 has been provided. For instance, certain geographies may be less trusted, or may not be associated with the account data 221 as a location 235. Also, unusual or atypical activity associated with an account may be a factor indicating risk.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 242. The display 242 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 245 and/or other applications. The client application 245 may be executed in a client device 206, for example, to access network content served up by the computing environment 203 and/or other servers, thereby rendering a user interface 248 on the display 242. To this end, the client application 245 may comprise, for example, a browser, a dedicated application, etc., and the user interface 248 may comprise a network page, an application screen, etc. The client device 206 may be configured to execute applications beyond the client application 245 such as, for example, email applications, social networking applications, and/or other applications.

The audio interface device 102 is representative of a plurality of audio or voice devices that may be coupled to the network 209. The audio interface device 102 may comprise, for example, a processor-based system such as a computer system. The audio interface device 102 may take the form of a standalone speaker device, a remote control device, a tablet computer, a smartphone, computing hardware integrated into a motor vehicle, or another type of client device. Some forms of the audio interface device 102 may have a display, while other forms may not. The audio interface device 102 includes one or more audio input devices 272 and one or more audio output devices 275. The audio input devices 272 may comprise a microphone, a microphone-level audio input, a line-level audio input, or other types of input devices. The audio output device 275 may comprise a speaker, a speaker output, a headphone output, a line-level audio output, or other types of output devices. In one embodiment, the audio interface device 102 includes at least one integrated microphone and at least one integrated speaker within a single enclosure.

The audio interface device 102 may also include a speech synthesizer 278 and one or more client applications 281. The speech synthesizer 278 may be configured to transform text inputs into speech for one or more languages using one or more standard voice profiles. The client applications 281 may enable functionality such as personal assistant functionality, home automation functionality, television control functionality, music playback functionality, and/or other interactive functions. The client applications 281 may be configured to perform natural language processing and/or speech to text functions.

It is noted that voice recognition and processing functions may be divided among the computing environment 203 and the audio interface device 102. Thus, the authentication service 218 may be communication with an application implementing the server-side functionality of the audio interface device 102. The server-side functions of the audio interface device 102 may be on the same servers as the computing environment 203 if operated by the same entity or they may be on servers operated by a different entity. The audio interface device 102 includes at least enough hardware or software in order to authenticate with one or more servers in the computing environment 203 and to facilitate communication between the audio interface device 102 and the computing environment 203 in an authenticated context.

Additional examples of an audio interface device 102 may be found in U.S. patent application Ser. No. 14/456,620, entitled "VOICE APPLICATION ARCHITECTURE," filed on Aug. 11, 2014, which was published as U.S. Patent Application Publication 2016/0042748 on Feb. 11, 2016; and in U.S. patent application Ser. No. 14/107,931, entitled "ATTRIBUTE-BASED AUDIO CHANNEL ARBITRATION," filed on Dec. 16, 2016, which was published as U.S. Patent Application Publication 2015/0170665 on Jun. 18, 2015. Both applications and their respective publications are incorporated herein by reference in their entirety.

Figure 3:
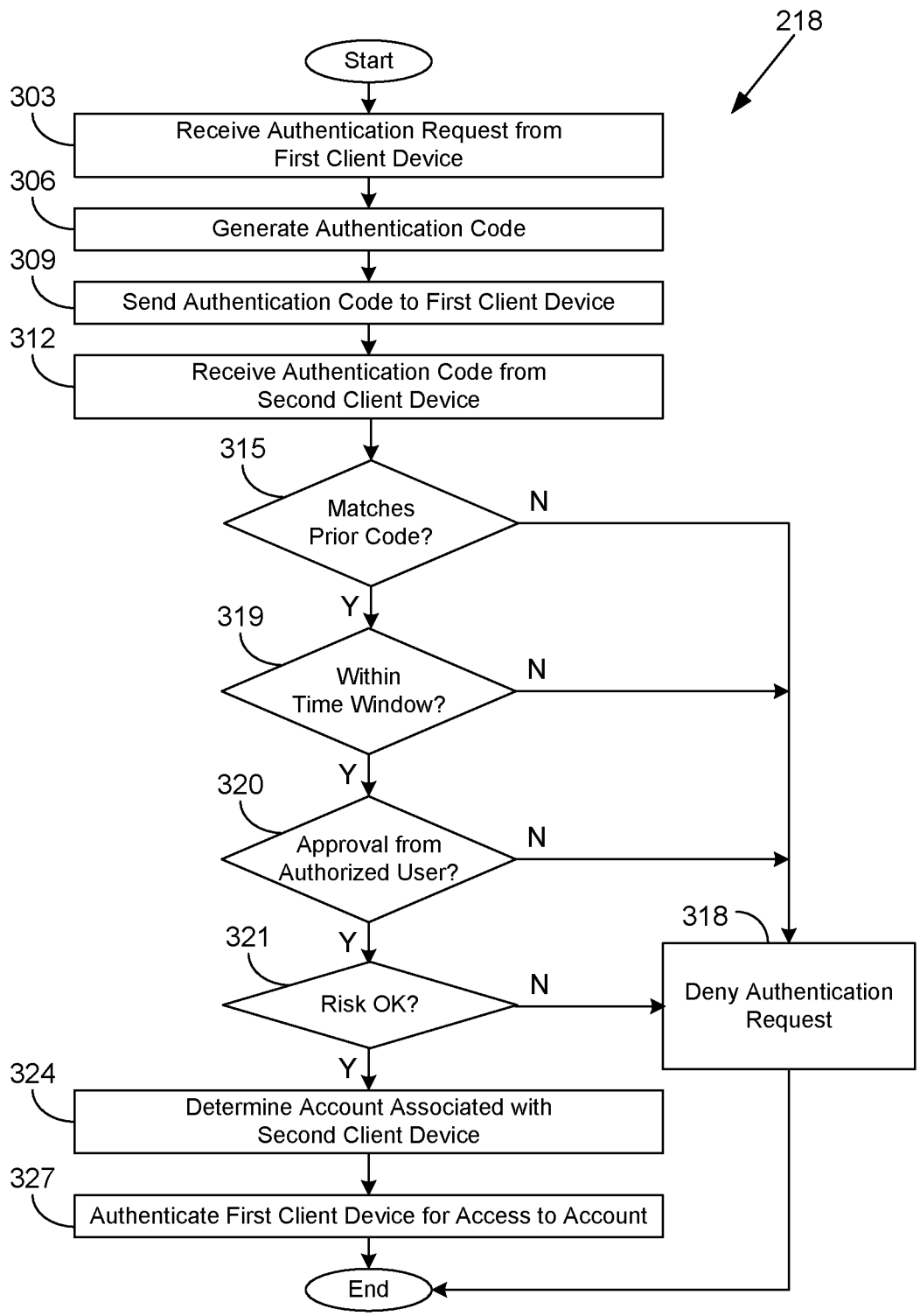
FIGS. 3 and 4 are flowcharts illustrating examples of functionality implemented as portions of an authentication service executed in a computing environment in the networked environment of FIG. 2 according to various embodiments of the present disclosure.

Turning now to FIG. 3, shown is a flowchart that provides one example of the operation of a portion of the authentication service 218 according to various embodiments. It is understood that the flowchart of FIG. 3 provides merely an example of the many different types of functional arrangements that may be employed to implement the operation of the portion of the authentication service 218 as described herein. As an alternative, the flowchart of FIG. 3 may be viewed as depicting an example of elements of a method implemented in the computing environment 203 (FIG. 2) according to one or more embodiments.

Beginning with box 303, the authentication service 218 receives an authentication request from a first client device 206 (FIG. 2). For example, the first client device 206 may be a television or set-top box, or another device lacking a keyboard or touchscreen, and the user may have navigated to setup functionality using a remote control. Specifically, the user may have selected an option to authenticate or register the first client device 206 using an existing account through a second client device 206, such as an audio interface device 102. Alternatively, the user may have activated a button or other control of the first client device 206 that causes the authentication request to be sent.

In box 306, the authentication service 218 generates an authentication code 107 (FIG. 2) in response to the authentication request. Alternatively, the first client device 206 may be configured to generate the authentication code 107 and to report the authentication code 107 to the authentication service 218. The authentication code 107 is generated according to rules specified in the authentication code generation rules 222 (FIG. 2). These rules may specify, for example, a required level of entropy for the authentication code 107, including a number of characters, a character set, a number of words, and/or a dictionary as may be applicable. The authentication code 107 may be generated randomly. In one embodiment, the authentication code 107 may be checked against other previously generated authentication codes 107 to ensure uniqueness. A time window 239 (FIG. 2) may be associated with the generated authentication code 107 and stored in the data store 215. In addition, the authentication request may specify a unique session identifier 236 (FIG. 2) which may also be stored in the data store 215 in association with the authentication code 107.

In box 309, the authentication service 218 sends the authentication code 107 to the first client device 206 by way of the network 209 (FIG. 2). The first client device 206 may thus be configured to present the authentication code 107 to the user by rendering it in a user interface 248 (FIG. 2) on a display 242. In another example, the first client device 206 may read out the authentication code 107 as audio via a speaker. In still other examples, the first client device 206 may broadcast the authentication code 107 as an ultrasonic signal (e.g., above the limits of human hearing at approximately 20 kHz), as modulated light via a display 242, as a two-dimensional barcode such as a quick response (QR)

code, as a broadcast message via a local computer network (e.g., WI-FI, BLUETOOTH, Ethernet, etc.).

While the authentication code 107 is being presented, the second client device 206 may be in a listening mode, or a user may cause the second client device 206 to enter a listening mode, e.g., by pressing a button or saying a wake word. The user may then say the authentication code 107 that is presented by the first client device 206, or the authentication code 107 may be broadcast by the first client device 206. The second client device 206 receives the authentication code 107 via an environmental sensor such as an audio input device 272 (FIG. 2).

The second client device 206 may solicit a user approval via speech generated by the speech synthesizer 278 and presented by the audio output device 275. This user approval may be provided in terms of a verbal confirmation, a physical gesture (e.g., a user performing a thumbs up gesture in front of a video sensor of the second client device 206), a button press on the second client device 206, or some other action. In box 312, the authentication service 218 receives the authentication code 107 from the second client device 206. The second client device 206 is already authenticated for access to the account. In some embodiments, the authentication service 218 may perform a speaker or voice identification on audio captured by the second client device 206 to verify that the speaker matches the voice recognition profile 234 (FIG. 2) associated with the account.

In box 315, the authentication service 218 begins a series of verifications, including determining whether the authentication code 107 received from the second client device 206 matches the prior authentication code 107 presented via the first client device 206. If there is not a match, the authentication service 218 moves to box 318 and denies the authentication request of the first client device 206. Thereafter, the operation of the portion of the authentication service 218 ends.

Otherwise, if the authentication code 107 received from the second client device 206 matches the prior authentication code 107, the authentication service 218 continues from box 315 to box 319. In box 319, the authentication service 218 determines whether the authentication code 107 is received from the second client device 206 within a time window 239 (FIG. 2) for validity. If the authentication code 107 is not received within the time window 239, the authentication service 218 moves to box 318 and denies the authentication request of the first client device 206. Thereafter, the operation of the portion of the authentication service 218 ends.

Otherwise, if the authentication code 107 is received within the time window 239, the authentication service 218 continues from box 319 to box 320. In box 320, the authentication service 218 may determine whether an approval has been received from an authorized user. For example, the authentication service 218 may also verify that the voice speaking the authentication code 107 or a verbal confirmation matches the voice recognition profile 234 of the authorized user. If an approval is not received, or if the approval is not received from the authorized user, the authentication service 218 may move to box 318 and deny the authentication request of the first client device 206. Thereafter, the operation of the portion of the authentication service 218 ends.

Otherwise, if an approval is received from an authorized user, the authentication service 218 continues from box 320 to box 321. In box 321, the authentication service 218 may confirm that any risk-based factors 223 (FIG. 2) do not weigh against authentication. For example, authentication may be denied if the first client device 206 is in an unusual or risky geographic area, or if a multiplicity of authentication requests are received from the first client device 206, or if other risk-based factors 223 weigh against authentication. If risk-based factors 223 weigh against authentication, the authentication service 218 may move to box 318 and deny the authentication request of the first client device 206. Thereafter, the operation of the portion of the authentication service 218 ends.

Otherwise, if risk-based factors 223 do not weigh against authentication, the authentication service 218 continues from box 321 to box 324. In box 324, the authentication service 218 determines an account associated with the second client device 206. In box 327, the authentication service 218 authenticates the first client device 206 for access to the same account. For example, the authentication service 218 may determine the session identifier 236 associated with the validated authentication code 107 and approve the corresponding session and first client device 206 to be given an access token 227 for the account. For example, the authentication service 218 may issue a registration token to the first client device 206 for access to the account. Thereafter, the operation of the portion of the authentication service 218 ends.

Figure 4:
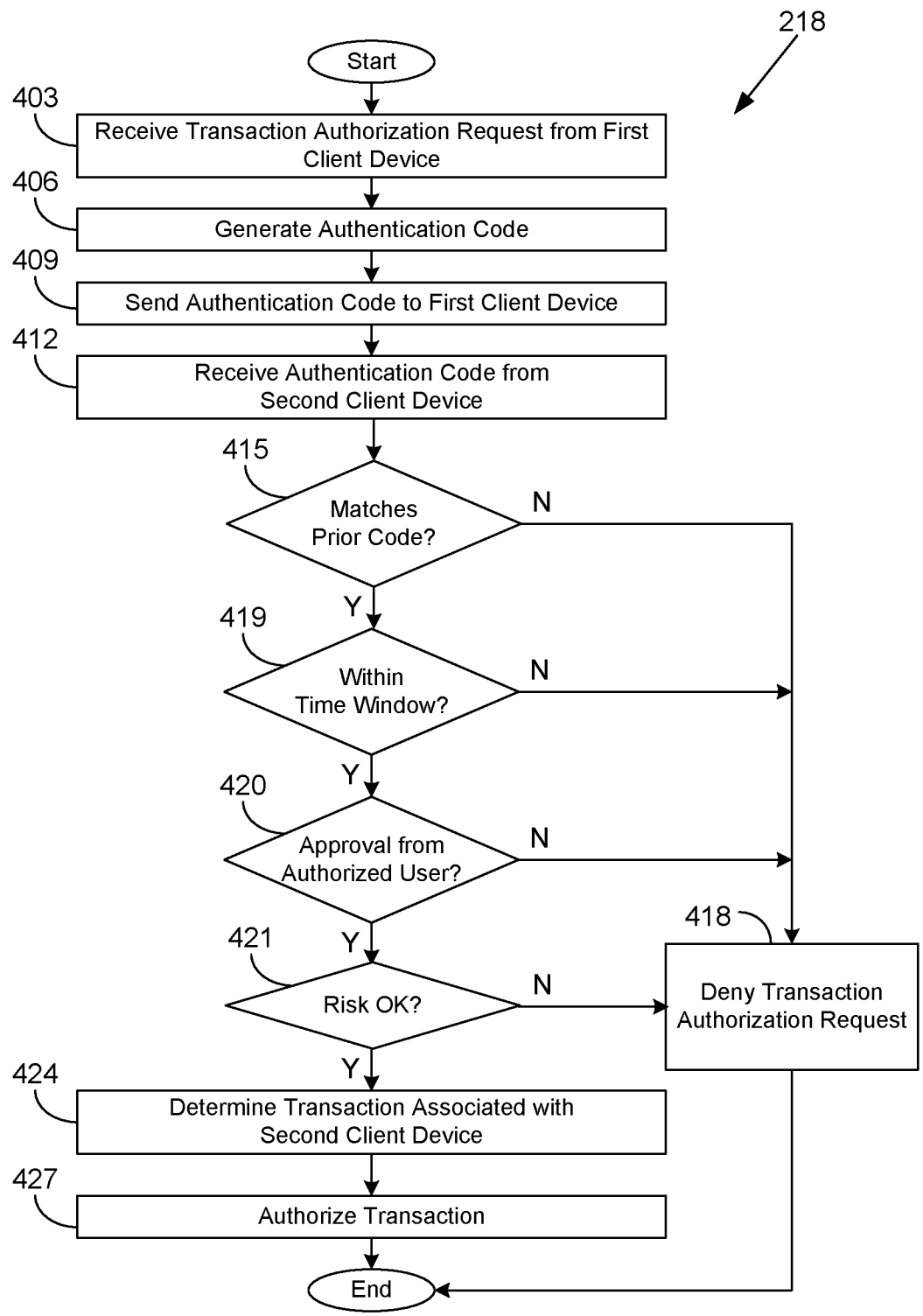

Referring next to FIG. 4, shown is a flowchart that provides one example of the operation of a portion of the authentication service 218 according to various embodiments. It is understood that the flowchart of FIG. 4 provides merely an example of the many different types of functional arrangements that may be employed to implement the operation of the portion of the authentication service 218 as described herein. As an alternative, the flowchart of FIG. 4 may be viewed as depicting an example of elements of a method implemented in the computing environment 203 (FIG. 2) according to one or more embodiments.

Beginning with box 403, the authentication service 218 receives a transaction authorization request from a first client device 206 (FIG. 2). For example, the first client device 206 may be a television, set-top box, or another device that lacks a keyboard or touchscreen. The user may have navigated to secured content, such as movie, that requires payment for purchase. Alternatively, the user may have activated a button or other control of the first client device 206 that causes the transaction authorization request to be sent.

In box 406, the authentication service 218 generates an authorization code in response to the transaction authorization request. Alternatively, the first client device 206 may be configured to generate the authorization code and to report the authorization code to the authentication service 218. The authorization code is generated according to rules specified in the authentication code generation rules 222 (FIG. 2). These rules may specify, for example, a required level of entropy for the authorization code, including a number of characters, a character set, a number of words, and/or a dictionary as may be applicable. The authorization code may be generated randomly. In one embodiment, the authorization code may be checked against other previously generated authorization code to ensure uniqueness. A time window 239 (FIG. 2) may be associated with the generated authorization code and stored in the data store 215. In addition, the authorization request may specify a unique session identifier 236 (FIG. 2) which may also be stored in the data store 215 in association with the authorization code.

In box 409, the authentication service 218 sends the authorization code to the first client device 206 by way of the network 209 (FIG. 2). The first client device 206 may thus be configured to present the authorization code to the user by rendering it in a user interface 248 (FIG. 2) on a display 242. In another example, the first client device 206 may read out the authorization code as audio via a speaker using a speech synthesizer 278. In still other examples, the first client device 206 may broadcast the authorization code as an ultrasonic signal (e.g., above the limits of human hearing at approximately 20 kHz), as modulated light via a display 242, as a broadcast message via a local network interface of the first client device 206 to a local computer network (e.g., WI-FI, BLUETOOTH, Ethernet, etc.).

While the authorization code is being presented, the second client device 206 may be in a listening mode, or a user may cause the second client device 206 to enter a listening mode, e.g., by pressing a button or saying a wake word. The user may then say the authorization code that is presented by the first client device 206, or the authorization code may be broadcast by the first client device 206. The second client device 206 receives the authorization code via an environmental sensor such as an audio input device 272 (FIG. 2).

The second client device 206 may solicit a user approval via speech generated by the speech synthesizer 278 and presented by the audio output device 275. In box 412, the authentication service 218 receives the authorization code from the second client device 206. The second client device 206 is already authenticated for access to an account capable of approving the transaction. In some embodiments, the authentication service 218 may perform a speaker or voice identification on audio captured by the second client device 206 to verify that the speaker matches the voice recognition profile 234 (FIG. 2) associated with the account, and that the speaker has permission to approve the pending transaction.

In box 415, the authentication service 218 begins a series of verifications, including determining whether the authorization code received from the second client device 206 matches the prior authorization code presented via the first client device 206. If there is not a match, the authentication service 218 moves to box 418 and denies the transaction authorization request of the first client device 206. Thereafter, the operation of the portion of the authentication service 218 ends.

Otherwise, if the authorization code received from the second client device 206 matches the prior authorization code, the authentication service 218 continues from box 415 to box 419. In box 419, the authentication service 218 determines whether the authorization code is received from the second client device 206 within a time window 239 (FIG. 2) for validity. If the authorization code is not received within the time window 239, the authentication service 218 moves to box 418 and denies the transaction authorization request of the first client device 206. Thereafter, the operation of the portion of the authentication service 218 ends.

Otherwise, if the authorization code is received within the time window 239, the authentication service 218 continues from box 419 to box 420. In box 420, the authentication service 218 may determine whether an approval has been received from an authorized user. For example, the authentication service 218 may also verify that the voice speaking the authentication code 107 or a verbal confirmation matches the voice recognition profile 234 of the authorized user. If an approval is not received, or if the approval is not received from the authorized user, the authentication service 218 may move to box 418 and deny the transaction authorization request of the first client device 206. Thereafter, the operation of the portion of the authentication service 218 ends.

Otherwise, if an approval is received from an authorized user, the authentication service 218 continues from box 420 to box 421. In box 421, the authentication service 218 may confirm that any risk-based factors 223 (FIG. 2) do not weigh against authorizing the transaction. For example, transaction authorization may be denied if the first client device 206 is in an unusual or risky geographic area, or if a multiplicity of requests are received from the first client device 206, or if other risk-based factors 223 weigh against authorization. If risk-based factors 223 weigh against transaction authorization, the authentication service 218 may move to box 418 and deny the transaction authorization request of the first client device 206. Thereafter, the operation of the portion of the authentication service 218 ends.

Otherwise, if risk-based factors 223 do not weigh against transaction authorization, the authentication service 218 continues from box 421 to box 424. In box 424, the authentication service 218 determines the pending transaction associated with the client device 206. In box 427, the authentication service 218 authorizes the transaction using payments or resources of an account associated with the second client device 206. For example, the authentication service 218 may cause a payment instrument (e.g., a bank account or credit card) associated with the account to be charged in order to authorize the transaction. Thereafter, the operation of the portion of the authentication service 218 ends.

Figure 5:
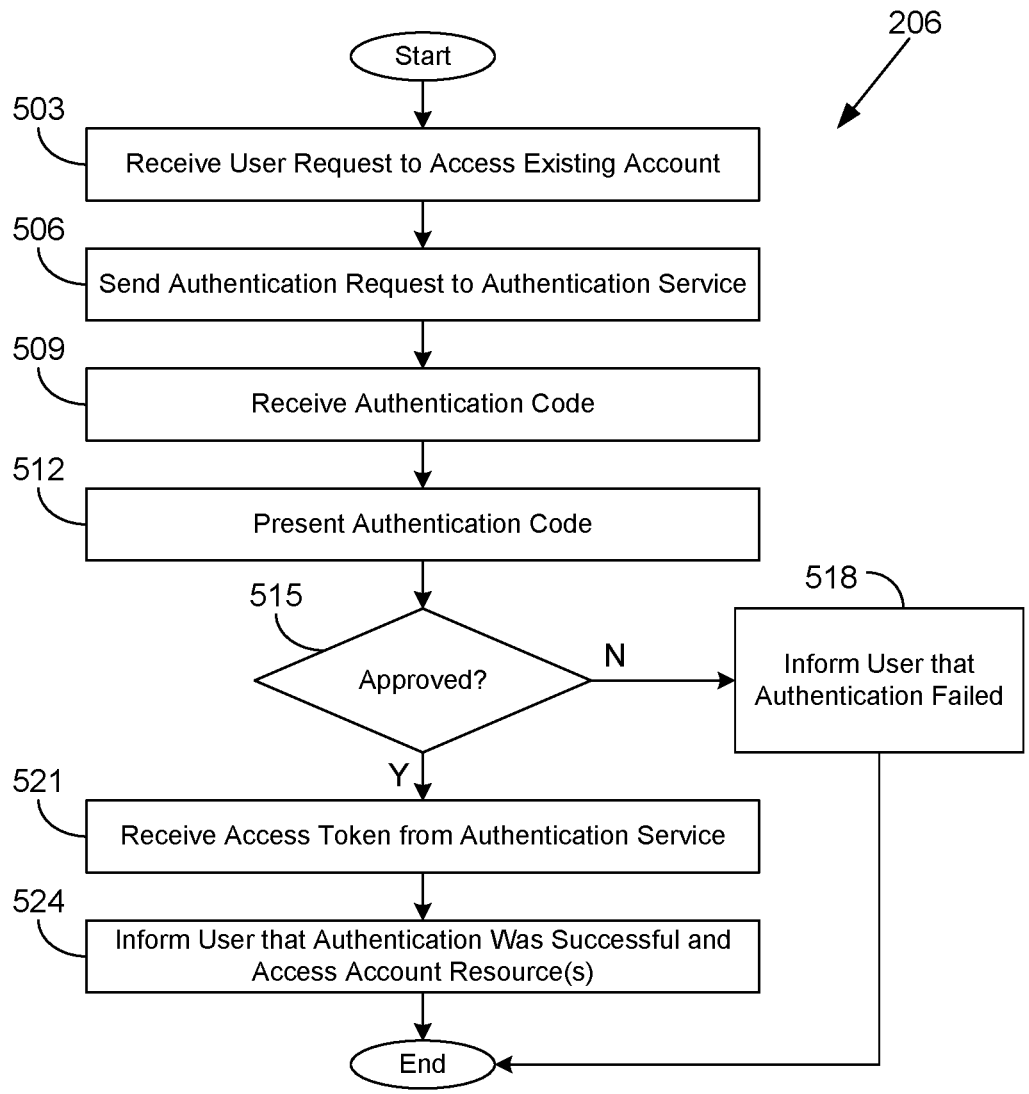
FIG. 5 is a flowchart illustrating one example of functionality implemented as portions of a client device in the networked environment of FIG. 2 according to various embodiments of the present disclosure.

Continuing to FIG. 5, shown is a flowchart that provides one example of the operation of a portion of the client device 206 according to various embodiments. It is understood that the flowchart of FIG. 5 provides merely an example of the many different types of functional arrangements that may be employed to implement the operation of the portion of the client device 206 as described herein. As an alternative, the flowchart of FIG. 5 may be viewed as depicting an example of elements of a method implemented in the client device 206 according to one or more embodiments.

Beginning with box 503, the client device 206 receives a user request to access resources of an existing account with an identity provider. For example, the user may select a button or other component on a user interface 248 that is associated with launching an authentication request for the identity provider. In box 506, the client device 206 sends an authentication request to the authentication service 218 (FIG. 2) via the network 209 (FIG. 2). The authentication request can include a session identifier 236 (FIG. 2). In one embodiment, the request may lack specification of a particular account, where the account may be inferred through the client device that is used to approve the authentication. In box 509, the client device 206 receives an authentication code 107 (FIG. 2) from the authentication service 218. Alternatively, the client device 206 may generate an authentication code 107 and inform the authentication service 218.

In box 512, the client device 206 presents the authentication code 107. In various examples, this may entail showing the authentication code 107 on the display 242 (FIG. 2), reading out the authentication code 107 via a speech synthesizer 278, modulating an ultrasonic signal or light signal with the authentication code 107, broadcasting the authentication code 107 via a local computer network, and/or other approaches. In some cases, the client device 206 may generate a wake signal in order to wake an audio interface device 102 (FIG. 2), so that the audio interface device 102 will enter a listening mode to recognize the authentication code 107 being broadcast. The authentication code 107 may be presented multiple times in a looping fashion. Delimiters and error correction coding may be used to ensure integrity of the transmission of the authentication code 107. For example, a cyclic redundancy check (CRC) may be performed on the authentication code 107 to verify its integrity.

In box 515, the client device 206 determines whether the authentication request was approved. For example, the authentication service 218 may communicate to the client device 206 that the request was approved or denied. Alternatively, lack of communication may indicate that the request was denied. If the request was not approved, the client device 206 may move from box 515 to box 518 and inform the user that the authentication has failed. Thereafter, the operation of the portion of the client device 206 ends.

Otherwise, if the authentication was succeeded, the client device 206 moves from box 515 to box 521 and receives an access token 227 (FIG. 2) from the authentication service 218. In box 524, the client device 206 informs the user that the authentication was successful and accesses one or more secured resources 230 (FIG. 2) of the account using the access token 227. Thereafter, the operation of the portion of the client device 206 ends.

Figure 6:
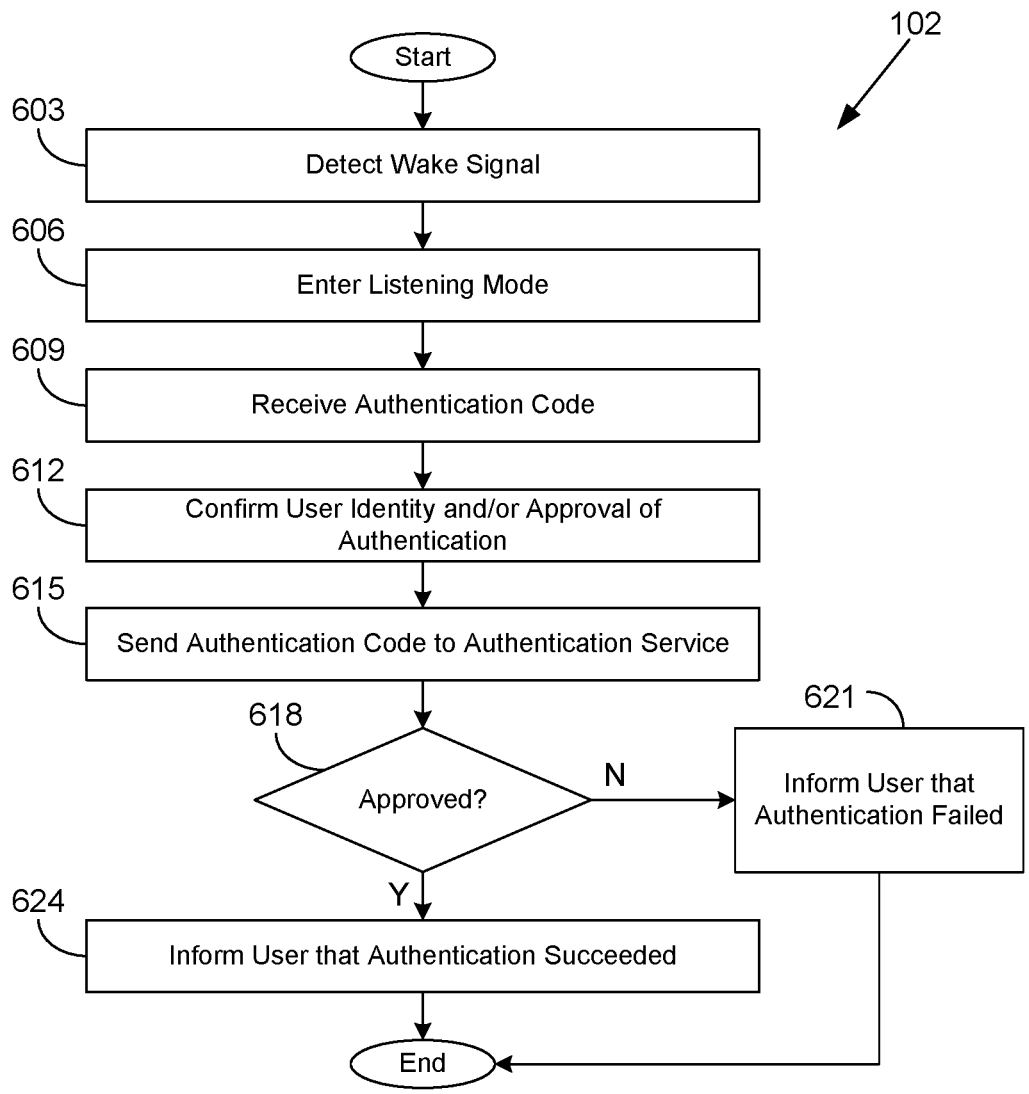
FIG. 6 is a flowchart illustrating one example of functionality implemented as portions of an audio interface device in the networked environment of FIG. 2 according to various embodiments of the present disclosure.

Referring next to FIG. 6, shown is a flowchart that provides one example of the operation of a portion of the audio interface device 102 according to various embodiments. It is understood that the flowchart of FIG. 6 provides merely an example of the many different types of functional arrangements that may be employed to implement the operation of the portion of the audio interface device 102 as described herein. As an alternative, the flowchart of FIG. 6 may be viewed as depicting an example of elements of a method implemented in the audio interface device 102 according to one or more embodiments.

Beginning with box 603, the audio interface device 102 detects a wake signal. This may correspond to a user saying a wake word or phrase, another device emitting a predefined sound or signal, or a user activating a button on the audio interface device 102. In some embodiments, the authentication code 107 may correspond to a wake signal. In other embodiments, a wake signal may be unnecessary, as the audio interface device 102 may always be in an active listening mode. In box 606, the audio interface device 102 enters an active listening mode via one or more environmental sensors, such as an audio input device 272 (FIG. 2). In box 609, the audio interface device 102 receives an authentication code 107 (FIG. 2), either by way of the user dictating the authentication code 107 or through a broadcast by the client device 206 (FIG. 2) that is requesting authentication. For example, the audio interface device 102 may receive the authentication code 107 as speech recorded via a microphone of the audio interface device 102.

In box 612, the audio interface device 102 may confirm the identity of the user and/or obtain a user approval of authentication. For example, the audio interface device 102 may perform a speaker recognition/identification procedure with reference to one or more known voice recognition profiles 234 (FIG. 2) to ensure that the user who is dictating the authentication code 107 and/or giving approval has permission. If the audio interface device 102 detects a broadcast of an authentication code 107 by a client device 206, the audio interface device 102 may request explicit approval from the user before proceeding with the authentication.

In one embodiment, multiple users potentially associated with multiple user accounts may be at a location 235. In such a case, the processing performed by the audio interface device 102 or at the backend by the computing environment 203 may identify an account out of multiple potential accounts corresponding to a particular speaker who has been identified as giving an approval or stating an authentication code 107. For example, the presence of a user at a particular location 235 may be registered by a mobile device of the user with the computing environment 203, and the computing environment 203 could include the corresponding voice recognition profile 234 of the user as a possibility when identifying speech at a geographic area surrounding the location 235.

In box 615, the audio interface device 102 sends the authentication code 107 and/or the audio containing the authentication code 107 to the authentication service 218 for processing. In box 618, the audio interface device 102 determines whether the authentication service 218 reports that the authentication has been approved. If authentication has not been approved, the audio interface device 102 moves from box 618 to box 621 and informs the user that the authentication has failed. Thereafter, the operation of the portion of the audio interface device 102 ends.

If the authentication has been approved, the audio interface device 102 instead proceeds from box 618 to box 624 and informs the user that the authentication has succeeded. The audio interface device 102 may give an indication that identifies the client device 206 that has been authenticated (e.g., a brand name and model number of a television). Thereafter, the operation of the portion of the audio interface device 102 ends.

Although the foregoing flowcharts of FIGS. 3-6 represent the authentication and transaction approval as being Boolean decisions, it is understood that additional logic may be present to handle situations of uncertainty. Uncertain voice identification or elevated risk factors may be mitigated through additional processes. As an example, a transaction intent verification may be pushed to a mobile device associated with the account. As another example, additional voice samples may be solicited from the user, e.g., by asking the user to repeat words.

Figure 7:
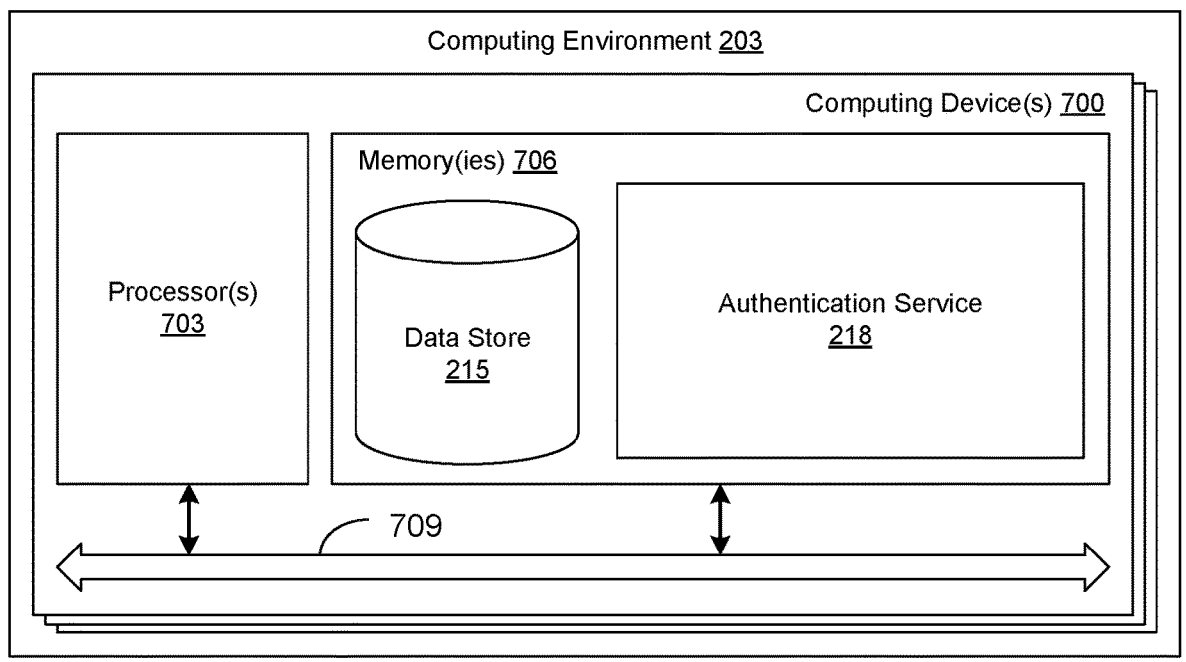
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 is the authentication service 218 and potentially other applications. Also stored in the memory 706 may be a data store 215 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the authentication service 218 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the authentication service 218, the client device 206, and the audio interface device 102. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 218, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authentication service 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    an authentication service executable in the at least one computing device, wherein when executed the authentication service causes the at least one computing device to at least:
        receive an authentication request from a client device lacking both a touchscreen and a keyboard;
        randomly generate an authentication code based at least in part on a required level of entropy and a time window for validity;
        send the authentication code to the client device;
        receive the authentication code from an audio interface device, the audio interface device having received the authentication code as speech recorded via a microphone of the audio interface device;
        determine that the authentication code received from the audio interface device matches the authentication code sent to the client device;
        determine that the authentication code was received from the audio interface device within the time window for validity;
        determine an account for which the audio interface device is authenticated;
        authenticate the client device for access to the account;
        in response to authenticating the client device, receive additional speech from the audio interface device recorded via the microphone, the additional speech including a specification of account data that is authorized to be shared with a third party associated with the client device; and
        implement an action in response to the additional speech.

2. The system of claim 1, wherein when executed the authentication service further causes the at least one computing device to at least:
    determine that a risk-based factor does not preclude authentication of the client device for access to the account; and
    issue a registration token to the client device for access to the account.

3. The system of claim 1, wherein when executed the authentication service further causes the at least one computing device to at least:
    determine a plurality of users associated with a location of the audio interface device;
    determine that the speech matches a voice profile of one of the plurality of users; and
    identify the account from a plurality of accounts based at least in part on the speech matching the voice profile of the one of the plurality of users.

4. The system of claim 1, wherein the audio interface device lacks a display.

5. A system, comprising:
    at least one computing device; and
    an authentication service executable in the at least one computing device, wherein when executed the authentication service causes the at least one computing device to at least:
        cause a first client device to present an authentication code via an output device of the first client device;
        receive the authentication code from a second client device, wherein the second client device is in an authenticated state for access to an account, and the second client device received the authentication code from an environmental sensor while in a listening mode;
        authenticate the first client device for access to the account in response to determining that the authentication code received from the second client device matches the authentication code presented by the first client device;
        in response to authenticating the first client device, receive an additional input from the second client device recorded via the environmental sensor, the additional input including a specification of account data that is authorized to be shared with a third party associated with the first client device; and
        implement an action in response to the additional speech.

6. The system of claim 5, wherein when executed the authentication service further causes the at least one computing device to at least:
    randomly generate the authentication code based at least in part on a required level of entropy and a time window for validity; and
    send the authentication code to the first client device via a network.

7. The system of claim 5, wherein the first client device is authenticated further in response to:
    performing voice identification on speech including the authentication code received by the second client device; and
    determining that an identified voice matches a voice profile of a user associated with the account.

8. The system of claim 5, wherein the first client device is authenticated further in response to determining that the authentication code is valid for the account according to a time window for validity for the authentication code.

9. The system of claim 5, wherein the second client device enters the listening mode after detecting a wake signal via the second client device.

10. The system of claim 5, wherein the second client device enters the listening mode after detecting a button press via the second client device.

11. The system of claim 5, wherein the output device of the first client device is a local network interface, and the first client device presents the authentication code by sending broadcast data via the local network interface.

12. The system of claim 5, wherein the output device of the first client device is a display, and the first client device presents the authentication code by showing the authentication code on the display.

13. The system of claim 5, wherein the output device of the first client device is a speaker, and the first client device presents the authentication code by emitting an audio signal via the speaker.

14. The system of claim 13, wherein the audio signal encodes the authentication code in an ultrasonic frequency range.

15. The system of claim 13, wherein the audio signal encodes the authentication code as a voice generated by a voice synthesizer.

16. A method, comprising:
- causing, via at least one of one or more computing devices, a first client device to present an authentication code via a display of the first client device;
- receiving, via at least one of the one or more computing devices, the authentication code from a second client device, wherein the second client device is in an authenticated state for access to an account, and the second client device received the authentication code as speech recorded via a microphone;
- authenticating, via at least one of the one or more computing devices, the first client device for access to the account in response to determining that the authentication code received from the second client device matches the authentication code presented by the first client device;
- in response to authenticating the first client device, receiving, via at least one of the one or more computing devices, additional speech from the second client device recorded via the microphone, the additional speech including a specification of account data that is authorized to be shared with a third party associated with the first client device; and
- implementing, via at least one of the one or more computing devices, an action in response to the additional speech.

17. The method of claim 16, further comprising:
- randomly generating, via at least one of the one or more computing devices, the authentication code; and
- sending, via at least one of the one or more computing devices, the authentication code to the first client device via a network.

18. The method of claim 16, wherein the account is unspecified by the first client device.

19. The method of claim 16, further comprising authorizing, via at least one of the one or more computing devices, a transaction associated with the first client device in response to determining that the authentication code received from the second client device matches the authentication code presented by the first client device.

20. The method of claim 16, wherein the second client device enters a listening mode after detecting a wake word via the microphone.

* * * * *